S. Mason,
Table Cutlery.
No. 87,786.   Patented Mar. 16, 1869.

Witnesses:
P. C. Wrenshall
Thos. B. Kerr

Inventor:
Samuel Mason
By Bakewell & Christy
Attorneys

SAMUEL MASON, OF BEAVER FALLS, PENNSYLVANIA, ASSIGNOR TO BEAVER CUTLERY COMPANY, OF SAME PLACE.

*Letters Patent No.* 87,786, *dated March* 16, 1869.

IMPROVEMENT IN TABLE-CUTLERY.

The Schedule referred to in these Letters Patent and making part of the same.

*To all whom it may concern:*

Be it known that I, SAMUEL MASON, of Beaver Falls, in the county of Beaver, and State of Pennsylvania, have invented a new and useful Improvement in Table-Cutlery; and I do hereby declare the following to be a full, clear, and exact description thereof.

In the old mode of manufacturing table-cutlery, a flat tang was made, as long and as broad as the handle desired, and on the opposite faces of this, scales were riveted, and thus the handle was made, sometimes with and sometimes without bolsters.

Cutlery thus made has always been liable to the objection that the edges of the tang are exposed, and are liable to oxidize; also to the further objection, that water will gradually work into the joints, between the tang and the scales, to the serious injury of both, oxidizing the faces of the former, and softening the latter till they become loose and fall off. Hence, a round tang has been substituted for a flat tang, but as this is liable to turn in the handle, or, if fastened by rivets, to split the handle, its use has been unsatisfactory.

The defects or disadvantages above referred to, I have entirely obviated by making a flat and round tang, by which to attach articles of table-cutlery to their handles, the flat part of the tang being next the blade, and by making a recessed, or bored, and slitted, or bifurcated handle, to which, by a rivet passing through both, to attach a knife-blade or fork so made; and therein consists the nature of my invention.

To enable others skilled in the art to make and use my invention, I will proceed to describe its construction and mode of operation, reference being had to the accompanying drawings, making a part of this specification, in which—

Figure 3:
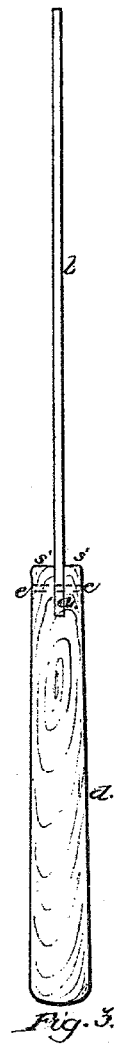

Figure 3, an edge view of the same attached to its handle.

Like letters of reference indicate like parts in each.

*b* is the blade of a table-knife, with a tang, consisting of a flat part, *a*, and what is technically known as a "round" part, *c*.

These parts are forged, or otherwise brought to the shape or form desired.

Figure 1:
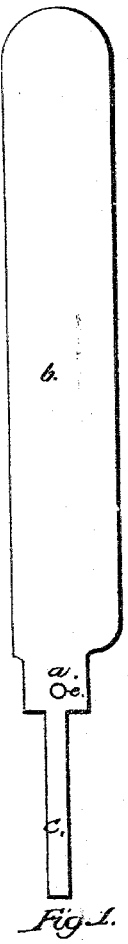
Figure 1 is a side view of a knife-blade with flat and round tang.
Figure 2:
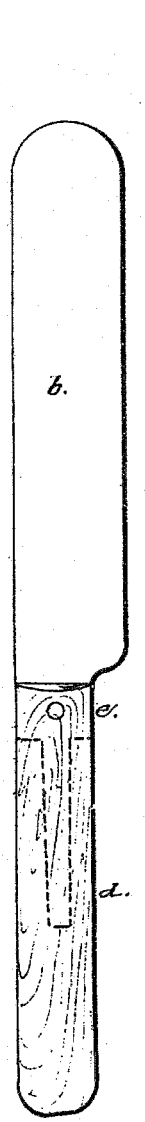
Figure 2 is a side.

The flat part *a* of the tang, should be broad enough, so that when inserted between the lips, or sides *s*, of a slit, or mortise in the end of a handle, *d*, it will be so engaged thereby, as to prevent the "round" part *c* from turning in the recess of the handle in is fitted, as shown by dotted lines in fig. 2.

Practically, I usually make the "round" tang, of square shape in cross-section, in ord( may fit the tighter in the round hole bore handle for its reception; but I do not limit 1 any particular shape, provided the same en cured.

The handle *d*, I make solid, of wood or ot able material, and slit, or mortise its end, as to receive the flat, *a*, and bore, or recess the receive the "round" *c*. The two are then gether, and a rivet, *e*, passing through the sides *s*, of the handle, and through the rive of the tang, holds them securely together.

A knife can be thus made more cheaply tha old method, as it requires less material for t and less work in making the handle. It is strong and durable as a knife made by the old is neater in its finish and general appearanc not liable to any of the objections above refer existing in connection with the knife made wit wholly flat or wholly round.

The same mode of making and attaching t; handles together, is applicable to other articles cutlery.

It will also be observed, that in a knife of struction described, the flat part of the tan the recess in the end of the handle, sufficientl a rivet to be passed through, to hold the two t and also that the round part of the tang ( extend through the rear, or outer end of the Hence,

What I claim as my invention, and desire t by Letters Patent, is—

Making articles of table-cutlery, in whic part, *a*, of the tang, shall enter a slit, or m( the end of the handle, to a depth such that may be fastened securely together by a rive in which a smaller, or "round" part, *c*, of t shall enter, but not pass entirely through the the handle, substantially as and for the pur[ forth.

In testimony whereof, I, the said SAMUEL have hereunto set my hand.

SAML. MA

Witnesses:
THOS. B. KERR,
C. C. TAYLOR.